(12) United States Patent
Ettes et al.

(10) Patent No.: US 11,476,720 B2
(45) Date of Patent: *Oct. 18, 2022

(54) WIRELESS POWER TRANSFER SYSTEM

(71) Applicant: KONINKLIJKE PHILIPS N.V., Eindhoven (NL)

(72) Inventors: Wilhelmus Gerardus Maria Ettes, Leeuwarden (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,389

(22) PCT Filed: Feb. 12, 2019

(86) PCT No.: PCT/EP2019/053381
§ 371 (c)(1),
(2) Date: Aug. 20, 2020

(87) PCT Pub. No.: WO2019/162141
PCT Pub. Date: Aug. 29, 2019

(65) Prior Publication Data
US 2020/0395793 A1    Dec. 17, 2020

(30) Foreign Application Priority Data

Feb. 20, 2018    (EP) .................................... 18157709

(51) Int. Cl.
*H02J 50/60* (2016.01)
*H02J 50/80* (2016.01)
(Continued)

(52) U.S. Cl.
CPC .............. *H02J 50/60* (2016.02); *H02J 50/12* (2016.02); *H02J 50/70* (2016.02); *H02J 50/80* (2016.02)

(58) Field of Classification Search
CPC .. H02J 50/60; H02J 50/80; H02J 50/12; H02J 50/70; H02J 7/00308; H02J 50/10
See application file for complete search history.

(56) References Cited

U.S. PATENT DOCUMENTS 9,479,013 B2    10/2016    Joye et al.
9,530,558 B2 *  12/2016    Nakano ................... H01F 38/14
(Continued)

FOREIGN PATENT DOCUMENTS

| EP | 3410568 A1 | 12/2018 |
| WO | 2014108785 A1 | 7/2014 |
| WO | 2015007518 A1 | 1/2015 |

OTHER PUBLICATIONS

International Search Report and Written Opinion From PCT/EP2019/053381 dated Mar. 14, 2019.

*Primary Examiner* — Pinping Sun

(57) ABSTRACT

A power transmitter (101) for a wireless power transfer system comprises a transmitter coil (103) and a driver (201) generates a drive signal) for the transmitter coil (103) employing a repeating time frame with a power transfer time interval and a reduced power time interval during which a power level of the power transfer signal is reduced. A driver (201) generates a drive signal for the transmitter coil (103) to generate the power transfer signal. A communicator (205) receives messages from the power receiver (105) and an adapter (213) adapts a timing property of the reduced power time interval in response to at least a first message received from the power receiver (105). A synchronizer (206) for synchronizing a foreign object detection and the generation of a test signal to occur during the reduced power time interval. The operation may typically be a foreign object detection or communication, and the timing property may e.g. be a duration of the reduced power time interval.

25 Claims, 6 Drawing Sheets

(51) Int. Cl.
*H02J 50/12* (2016.01)
*H02J 50/70* (2016.01)

(56) References Cited

U.S. PATENT DOCUMENTS

| | | | |
|---|---|---|---|
| 9,625,501 B2 | 4/2017 | Van Wageningen | |
| 9,716,388 B2 | 7/2017 | Van Wageningen | |
| 10,103,584 B2 | 10/2018 | Van Wageningen | |
| 10,615,646 B2 | 4/2020 | Staring et al. | |
| 11,038,381 B2* | 6/2021 | Van Wageningen | H02J 50/60 |
| 2008/0043656 A1* | 2/2008 | Yoon | G06F 1/3209 |
| | | | 370/311 |
| 2009/0325651 A1* | 12/2009 | Kondo | H02J 7/00045 |
| | | | 455/573 |
| 2010/0225173 A1* | 9/2010 | Aoyama | H02J 7/00045 |
| | | | 320/108 |
| 2014/0339907 A1* | 11/2014 | Omae | H02J 7/00304 |
| | | | 307/104 |
| 2015/0155918 A1* | 6/2015 | Van Wageningen | H02J 50/12 |
| | | | 307/104 |
| 2015/0341085 A1* | 11/2015 | Ettes | H04B 5/0037 |
| | | | 307/104 |
| 2016/0087690 A1 | 3/2016 | Tsukamoto | |
| 2016/0126747 A1 | 5/2016 | Kato et al. | |
| 2016/0181818 A1* | 6/2016 | Joye | H02J 50/60 |
| | | | 307/104 |
| 2017/0018977 A1* | 1/2017 | Van Wageningen | H02J 50/90 |
| 2017/0093214 A1* | 3/2017 | Watanabe | H02J 50/10 |
| 2017/0141604 A1 | 5/2017 | Park et al. | |
| 2017/0229920 A1* | 8/2017 | Joye | H04B 5/0031 |
| 2017/0288412 A1* | 10/2017 | Yamamoto | H02J 50/70 |
| 2018/0317174 A1* | 11/2018 | Chaubey | H04W 52/0248 |
| 2019/0334388 A1 | 10/2019 | Van Wageningen | |
| 2020/0212725 A1 | 7/2020 | Van Wageningen | |
| 2021/0265872 A1* | 8/2021 | Van Wageningen | H02J 50/60 |

* cited by examiner

WIRELESS POWER TRANSFER SYSTEM

CROSS-REFERENCE TO PRIOR APPLICATIONS

This application is the U.S. National Phase application under 35 U.S.C. § 371 of International Application No. PCT/EP2019/053381, filed on Feb. 12, 2019, which claims the benefit of EP Patent Application No. EP 18157709.9, filed on Feb. 20, 2018. These applications are hereby incorporated by reference herein.

FIELD OF THE INVENTION

The invention relates to operation of a wireless power transfer system and in particular to foreign object detection in a wireless power transfer system.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

In power transfer systems, such as Qi, the electromagnetic field generated to in order to transfer the required levels of power to the power receiver is often very substantial. The presence of such a strong field may in many situations have an impact on the surroundings.

For example, a potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

The requirement for a small measurement signal may result in other disadvantageous effects. A power receiver exposed to a small measurement signal may exhibit a leakage current that depends on the level of the measurement signal, the coupling between the primary and secondary coil, and the charging state of a capacitor at the output of the rectifier. This leakage current can therefore be different depending on the actual conditions. Since leakage current influences the reflected impedance at the power transmitter coil, the measurement of the quality factor will also depend on the specific current conditions.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

The difficulties of accurate foreign object detection are particularly difficult in scenarios wherein the power level of the power transfer signal is high and/or when it varies. Thus, foreign object detection is particularly difficult during the power transfer phase, and especially for power receivers that represent a large and varying load.

Other operations of the power transfer system may furthermore be sensitive to such effects. For example, in many situations, communication between the power transmitter and power receiver may be negatively affected by large loads, and in particular by large load variations.

In many systems, communication from the power receiver to the power transmitter may use load modulation where a load of the power transfer signal is varied in dependence on the data to be transmitted. However, such load modulation may be difficult to detect if the power transfer loading of the power transfer signal varies at the same time. Similarly, communication from the power transmitter to the power receiver may be achieved by modulating the power transfer signal (e.g. amplitude or frequency modulation) but interference to such modulation may be caused by variations in the parameters of the power transfer signal due to a varying load.

Indeed, even if a completely separate carrier is used for communication, such as a NFC communication link, a very large and varying electromagnetic field caused by the power transfer signal may cause substantial interference despite being in a very different frequency band.

Thus, the presence of the power transfer signal, and the loading thereof, may have detrimental impact on other operations, such as foreign object detection and communication operations.

Hence, an improved operation for a power transfer system would be advantageous, in particular, an approach allowing increased flexibility, reduced cost, reduced complexity, improved foreign object detection, improved communication, improved support for different loads, improved adaptability, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for wirelessly providing power to a power receiver via an electromagnetic power transfer signal; the power transmitter comprising: a transmitter coil for generating the power transfer signal, the power transfer signal during a power transfer phase employing a repeating time frame comprising at least a power transfer time interval and a reduced power time interval during which a power level of the power transfer signal is reduced; a driver for generating a drive signal for the transmitter coil to generate the power transfer signal; a first communicator for receiving messages from the power receiver; an adapter for adapting a timing property of the reduced power time interval in response to at least a first message received from the power receiver; and a synchronizer for synchronizing an operation of the power transmitter to occur during the reduced power time interval; a test coil for generating an electromagnetic test signal; a test generator arranged to generate a test drive signal for the test coil; and a foreign object detector arranged to perform a foreign object detection test in response to a measured parameter for the test drive signal during the reduced power time interval; wherein the synchronizer is arranged to synchronize the test generator to provide the electromagnetic test signal during the reduced power time interval.

The invention may provide improved performance in many embodiments, and may provide an overall improved power transfer operation in many systems and embodiments. For example, in many embodiments, improved foreign object detection, and possibly communication, may be achieved by performing these operation during time intervals created to provide particularly advantageous conditions for such operations.

The approach may in many embodiments reduce complexity, and may in many systems provide a high degree of backwards compatibility. Specifically, the approach may be particularly suitable for improving foreign object detection, and possibly communication, in Qi wireless power transfer systems e.g. operating in accordance with version 1.2 or earlier of the Qi Specifications.

In many embodiments, a duration of the reduced power time interval is no more than 5%, 10%, or 20% of the duration of the time frame. In many embodiments, the duration of the reduced power time interval(s) is no less than 70%, 80%, or 90% of the time frame.

The power transmitter may in some embodiments be arranged to perform a foreign object detection, and possibly a communication operation, during the reduced power transfer time interval. The power transmitter may in some embodiments be arranged to adjust a timing of either a foreign object detection, and possibly a communication operation, to occur during the reduced power transfer time interval.

During the reduced power time interval, the power level of the power transfer signal is reduced corresponding to the level of power being transferred from the power transmitter to the power receiver being reduced. During the reduced power time interval, a power level of power transferred from the power transmitter to the power receiver is reduced relative to a power level of power transferred from the power transmitter to the power receiver during the power transfer time interval (of the same reduced power time interval). The power level, and references to power and power level, may specifically be considered to relate to the real power ($I \cdot U \cdot \cos \phi$).

In accordance with an optional feature of the invention, the timing property is a duration of the reduced power time interval.

The system may be arranged to adapt the duration of the reduced power time interval in response to a communication from the power receiver to the power transmitter. This may allow improved operation in many embodiments, and may allow operations, such as communication or foreign object detection, to be performed at times during which conditions are particularly suitable therefor. The adaptation of the duration of the reduced power time interval may ensure improved trade-offs between different conflicting requirements, e.g. between the requirements and preferences for transfer of power from the power transmitter to the power receiver, and the requirements and preferences for foreign object detection and communication.

The power transmitter may be arranged to adapt the duration of the reduced power time interval subject to a minimum duration.

In accordance with an optional feature of the invention, the timing property is a duration between reduced power time intervals of consecutive repeating time frames.

In some embodiments, the timing property is a duration between consecutive repeating time frames. In some embodiments, the timing property is a duration of the repeating time frames.

The system may be arranged to adapt the duration between reduced power time intervals of consecutive repeating time frames in response to a communication from the power receiver to the power transmitter. This may allow improved operation in many embodiments, and may allow operations, such as communication or foreign object detection to be performed at times during which conditions are particularly suitable therefor. The adaptation of the duration between reduced power time intervals of consecutive repeating time frames may ensure improved trade-offs between different conflicting requirements, e.g. between the requirements and preferences for transfer of power from the power transmitter to the power receiver, and the requirements and preferences for foreign object detection and communication.

The power transmitter may be arranged to adapt the duration between the reduced power transfer time of sequential repeating time frames subject to a maximum duration.

In accordance with an optional feature of the invention, the first communicator is arranged to transmit messages to the power receiver; and the power transmitter is arranged to transmit a message indicative of at least one of a duration of the reduced power time interval and a duration between reduced power time intervals of consecutive repeating time frames to the power receiver prior to receiving the first message.

This may provide particularly advantageous operation in many embodiments. The message may specifically indicate acceptable, allowable, restricted, and/or preferred values.

The message may specifically be transmitted in response to a request for such information transmitted from the power receiver to the power transmitter.

In accordance with an optional feature of the invention, the first message is a request message indicative of a requested value for the timing property; and the power transmitter is arranged to accept or reject the requested value.

This may provide particularly advantageous operation in many embodiments. It may specifically allow for the power receiver to retain initiative or control of the operation which may be particularly advantageous in many scenarios.

In accordance with an optional feature of the invention, the adapter is arranged to determine the timing property during an initialization phase prior to the power transfer phase.

This may provide particularly advantageous operation in many embodiments and may in particular allow low complexity operation in many embodiments.

In accordance with an optional feature of the invention, the adapter is arranged to dynamically adapt the timing property during the power transfer phase in response to a plurality of messages received from the power receiver during the power transfer phase.

This may provide particularly advantageous operation in many embodiments and may in particular allow optimization for the current conditions.

In accordance with an optional feature of the invention, the first communicator is arranged to synchronize communication with the power receiver to occur during the reduced power time intervals.

The invention may allow improved communication in many embodiments. The approach may allow improved accuracy and/or reliability of communication between the power receiver and the power transmitter during the power transfer phase.

The synchronization of the communication may be only for some communication, such as e.g. only for power control communication, only for communication from the power transmitter to the power receiver, or only from the power receiver to the power transmitter, etc.

The power transmitter further comprises: a test coil for generating an electromagnetic test signal; a test generator arranged to generate a test drive signal for the test coil; and a foreign object detector arranged to perform a foreign object detection test in response to a measured parameter for the test drive signal during the reduced power time interval; wherein the synchronizer is arranged to synchronize the test generator to provide the electromagnetic test signal during the reduced power time interval.

The invention may allow improved foreign object detection in many embodiments. The approach may allow for improved accuracy and/or reliability of foreign object detection tests during the power transfer phase. In many embodiments, the approach may reduce uncertainty and variation for the foreign object detection tests thereby improving performance. The approach may specifically reduce the impact on power transfer variations and operating conditions on the foreign object detection. The approach may for example bias the system towards working at a specific, e.g. predetermined, reference scenario and operating point during the foreign object detection. This may improve consistency and predictability for the foreign object detection test. In particular, it may allow a more accurate and more reliable estimation of the impact of the power receiver on the electromagnetic test signal, and thus may allow the foreign object detector to improve compensation therefor.

The approach may e.g. introduce a foreign object detection time interval in which the power receiver can operate with both a high induced voltage yet light load, corresponding to a high magnetic field strength yet low loading of the electromagnetic signal. In such scenarios, the impact of a foreign object may be more noticeable as power induced in such an object will represent a higher proportion of the total power extracted. Indeed, the higher magnetic strength may result in a higher induced signal in any foreign object being present, and the reduced loading may reduce the impact of the presence of the power receiver when detecting whether a foreign object is present.

The foreign object detector may be arranged to determine that a foreign object is detected if a difference between the power level of the electromagnetic test signal and the power indicated by a loading indication received from the power receiver and indicating an expected load of the electromagnetic test signal is above a threshold. If the difference is below the threshold, the foreign object detector may determine that no foreign object is detected.

The foreign object detector may be arranged to determine that a foreign object is detected if a quality measure (determined from measurements of the drive signal) for a resonance circuit comprising the test coil is below a threshold. The threshold may typically be dependent on a message received from the power receiver.

In many embodiments, the test coil and the transmitter coil may be the same coil. In many embodiments, the driver and the test generator may be the same entity, thus the same circuitry may generate both the drive signal and the test drive signal. In many embodiments, the power transfer signal and the test drive signal may share many parameter values, for example they may have the same frequency.

According to an aspect of the invention, there is provided a wireless power transfer system comprising a power transmitter as described above and further comprising the power receiver, the power receiver comprising: a second communicator for communicating with the power transmitter; a request controller for transmitting the first message to the power transmitter, the first message comprising a request for a requested value of the timing property; a response controller for receiving a request response from the power transmitter and to determine the timing property in response to the request response, the request response being indicative of whether the requested value has been accepted by the power transmitter; and a load controller for adapting a loading of the power transfer signal such that the loading is reduced during the reduced power time intervals.

The invention may provide improved operation for a wireless power transfer system.

In accordance with an optional feature of the invention, the request controller is arranged to request a timing property constraint from the power transmitter; the response controller is arranged to receive a timing property constraint indication from the power transmitter, and the request controller is arranged to determine the requested value of the timing property in response to the timing property constraint.

This may allow improved and/or facilitated operation in many embodiments.

In accordance with an optional feature of the invention, the timing property is a duration of the reduced power time interval and the request controller is arranged to determine the requested value of the timing property subject to a maximum duration and the adapter is arranged to determine a value for the timing property in response to a minimum duration.

This may allow improved and/or facilitated operation in many embodiments.

In some embodiments, the power receiver may impose a maximum value and the power transmitter may impose a minimum value on the duration of the reduced power time interval.

In accordance with an optional feature of the invention, the timing property is a duration between the reduced power transfer time of sequential repeating time frames and the request controller is arranged to determine the requested value of the timing property subject to a minimum duration and the adapter is arranged to determine a value for the timing property in response to a maximum duration.

This may allow improved and/or facilitated operation in many embodiments.

In some embodiments, the power receiver may impose a minimum value and the power transmitter may impose a maximum value on the duration between the reduced power transfer time of sequential repeating time frames.

According to an aspect of the invention there is provided a method of operation for a power transmitter for wirelessly providing power to a power receiver via an electromagnetic power transfer signal; the method comprising the power transmitter performing the steps of: generating the power transfer signal, the power transfer signal during a power transfer phase employing a repeating time frame comprising at least a power transfer time interval and a reduced power time interval during which a power level of the power transfer signal is reduced; generating a drive signal for the transmitter coil to generate the power transfer signal; receiving messages from the power receiver; adapting a timing property of the reduced power time interval in response to at least a first message received from the power receiver; and synchronizing an operation of the power transmitter to occur during the reduced power time interval; generating a test drive signal for a test coil to generate an electromagnetic test signal; and performing a foreign object detection test in response to a measured parameter for the test drive signal during the reduced power time interval; wherein the synchronizing comprises synchronizing the test drive signal to provide the electromagnetic test signal during the reduced power time interval.

According to an aspect of the invention there is provided a method of operation for a wireless power transfer system comprising a power transmitter wirelessly providing power to a power receiver via an electromagnetic power transfer signal; the method comprising the power transmitter performing the steps of: generating the power transfer signal, the power transfer signal during a power transfer phase employing a repeating time frame comprising at least a power transfer time interval and a reduced power time interval during which a power level of the power transfer signal is reduced; generating a drive signal for the transmitter coil to generate the power transfer signal; receiving messages from the power receiver; adapting a timing property of the reduced power time interval in response to at least a first message received from the power receiver; and synchronizing an operation of the power transmitter to occur during the reduced power time interval; generating a test drive signal for a test coil to generate an electromagnetic test signal; performing a foreign object detection test in response to a measured parameter for the test drive signal during the reduced power time interval; wherein the synchronizing comprises synchronizing the test drive signal to provide the electromagnetic test signal during the reduced power time interval; and the method further comprising the power receiver performing the steps of: communicating with the power transmitter; transmitting the first message to the power transmitter, the first message comprising a request for a requested value of the timing property; receiving a request response from the power transmitter; determining the timing property in response to the request response, the request response being indicative of whether the requested value has been accepted by the power transmitter; and adapting a loading of the power transfer signal such that the loading is reduced during the reduced power time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
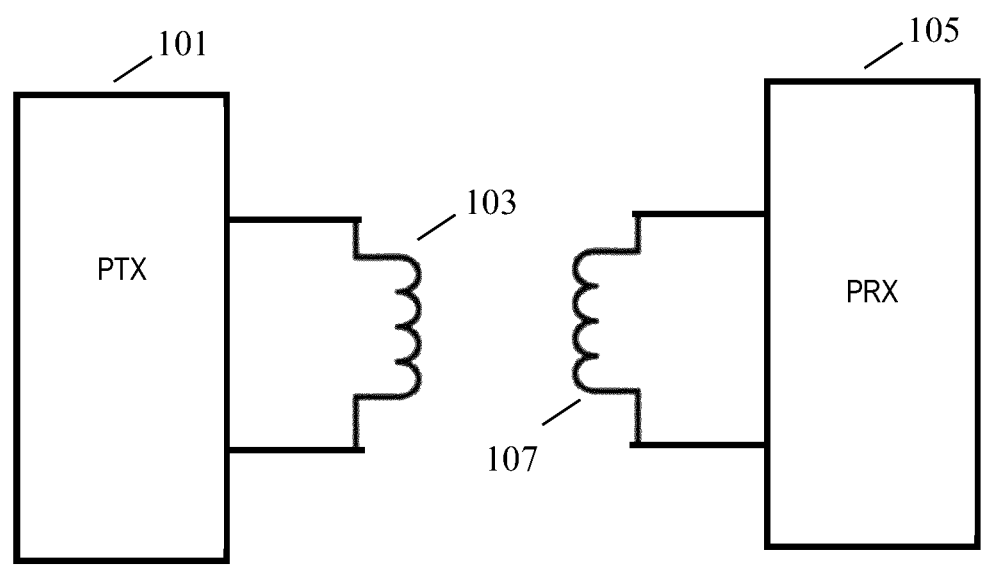
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may correspond to the electromagnetic power transfer component representing the energy transfer from the power transmitter to the power receiver, and may be considered to correspond to the component of the generated electromagnetic field that transfers power from the power transmitter to the power receiver. For example, if there is no loading of the receive coil 107, no power will be extracted by the power receiver from the generated electromagnetic field (apart from losses). In such a scenario, the driving of the transmitter coil 103 may generate an electromagnetic field of potentially high field strength but the power level of the power transfer signal will be zero (apart from losses). In some situations, where a foreign object is present, the power transfer signal may be considered to include a component corresponding to the power transfer to the foreign object, and thus the power transfer signal may be considered to correspond to the power being extracted from the electromagnetic field generated by the power transmitter.

The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high-power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In the following, the operation of the system of FIG. 1 will be described with specific focus on foreign object detection.

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

The inventors have realized that conventional foreign object detection operates suboptimally and that this is partly due to variations and uncertainties in the specific operating conditions and scenario in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. For example, if a measurement for a foreign object detection takes place in the selection phase of a Qi power transfer initialization phase, the signal that the power transmitter provides for this measurement has to be small enough not to wake up the power receiver. However, this typically result in poor signal/noise ratios leading to reduced detection accuracy. Therefore, the detection performance may be sensitive to the specific signal level applied and there will typically be conflicting requirements.

A power receiver exposed to a small electromagnetic signal may show a leakage current that depends on the level of the electromagnetic signal, the coupling between the primary and secondary coil, and the charging state of the capacitor at the output of the rectifier. This leakage current can therefore vary depending on the actual conditions currently experienced and depending on the specific parameters (e.g. properties of capacitor) of the individual power receiver. Since leakage current influences the reflected impedance at the primary coil, the measurement of the quality factor also depends on the actual conditions and this typically prevents optimal detection.

Yet another problem detecting a foreign object based on e.g. reported received power indications at different loads or signal levels can be less reliable than desired due to the relationships between transmitted and received power being different for different loads and signals levels.

The system of FIG. 1 uses an approach for foreign object detection that seeks to reduce uncertainty and sensitivity to variations, and accordingly it seeks to provide improved foreign object detection. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

Another operation that may be affected by the properties (and especially the variations of the properties) of the power transfer signal is communication between the power receiver and the power transmitter (in either direction). As will be described later, communication from the power receiver to the power transmitter is often using load modulation where a loading of the power transfer signal by the power receiver is varied in accordance with the data to be transmitted. The power transmitter may then detect the resulting variations in the drive signal generating the power transfer signal and therefrom decode the transmitted data. However, the impact of the load modulation is difficult to determine when the effective loading of the power transfer signal by the power receiver is very high, and even further complicated when this load is varying.

The system of FIG. 1 uses an approach for communication that seeks to reduce uncertainty and sensitivity, and accordingly it seeks to provide improved communication performance, especially for load modulation communication from the power receiver to the power transmitter. The approach may in many embodiments provide improved communication and specifically may in many embodiments provide a more accurate and/or reliable communication from the power receiver to the power transmitter. The approach may further allow low complexity and low resource requirements. An advantage of the approach is that it may be suitable for inclusion in many existing systems, such as specifically in a Qi wireless power transfer system, and indeed that this may often be achieved with few modifications.

As will be described in more detail in the following, the approach utilizes a time division approach during the power transfer phase wherein operations, such as foreign object detection and communication, and power transfer may e.g. be performed in different time intervals thereby allowing the interference between these (specifically the impact of the power transfer on the foreign object detection/communication) to be reduced substantially.

Specifically, for the wireless power transfer system, the power transfer signal is subject to a repeating time frame which comprises at least one power transfer time interval and one reduced power time interval.

The power level of the power transfer signal is reduced during the reduced power time interval relative to the power transfer time interval, and typically the maximum allowable power is no less than 5, 10, or 50 times lower than the power level during the reduced power time interval than during the power transfer time interval. The reduction in the power level may result from actions at the power transmitter and/or at the power receiver. For example, in some embodiments, the power transmitter may be arranged to switch off the power transfer signal during the reduced power time interval and/or the power receiver may be arranged to disconnect the load during the reduced power time interval.

The power transmitter (and typically the power receiver) may then arrange for one or more operations (functions, processes, procedures) to be performed during the reduced power time interval, i.e. it may synchronize the execution of one or more operations of the power transmitter to occur during the reduced power time interval. For example, it may typically synchronize the performance of the foreign object detection, and possibly communication, to occur during the reduced power time interval. In this way, it can be achieved that the impact of the power transfer and the power transfer signal on the given operation, specifically the foreign object detection and the communication, can be reduced and often minimized.

Figure 2:
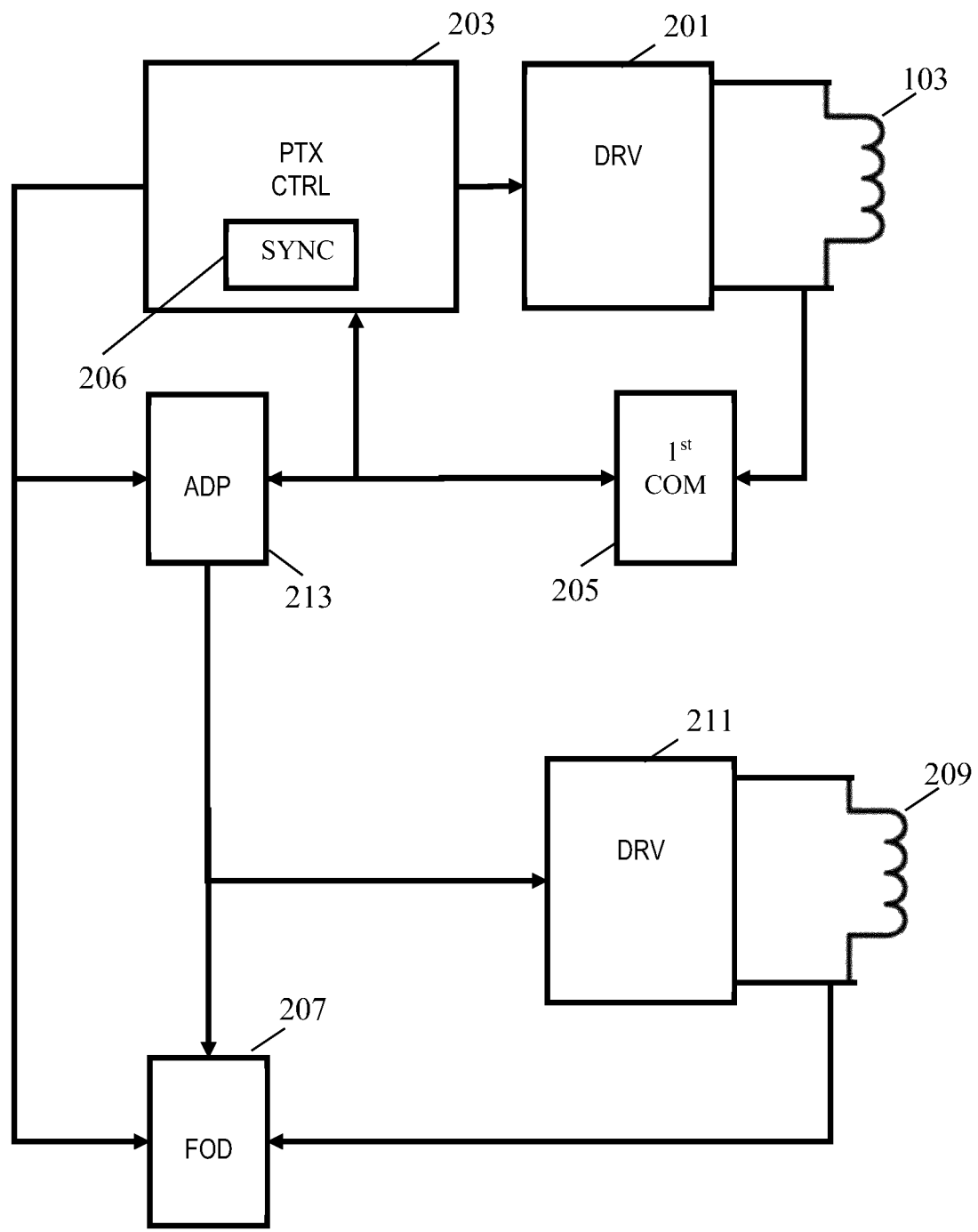
FIG. 2 illustrates an example of elements of a power transmitter in accordance with some embodiments of the invention.
Figure 3:
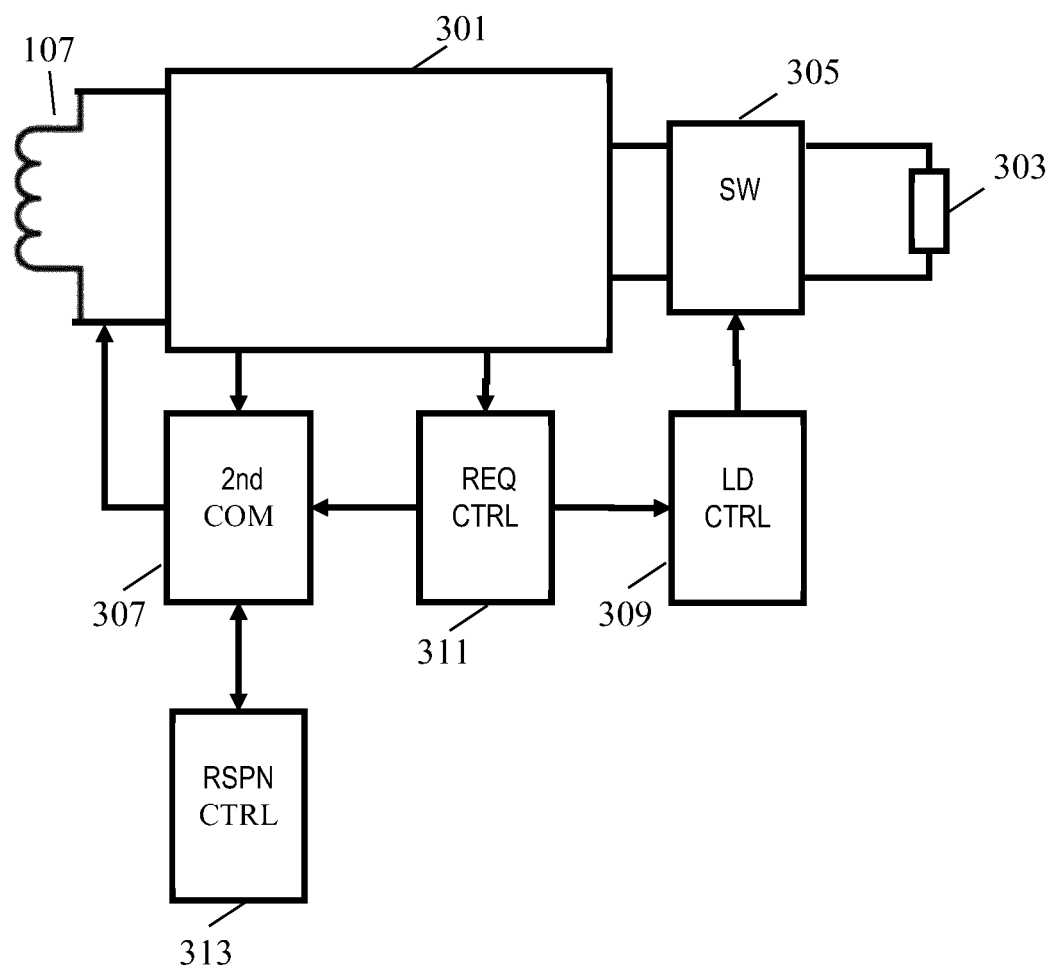
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates the electromagnetic power transfer signal, which can provide a power transfer to the power receiver 105. The power transfer signal is provided (at least) during power transfer time intervals of the power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a first communicator 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the first communicator 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In many embodiments, the first communicator 205 is further arranged to transmit data to the power receiver 105, and may specifically be arranged to modulate the power transfer signal using frequency, amplitude, or phase modulation.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

In the system of FIGS. 1-3, the communication is during the power transfer phase performed in reduced power time intervals. Specifically, some or indeed all of the reduced power time intervals may be communication time intervals in which communication between the power transmitter 101 and the power receiver 105 is performed. Specifically, the transmitter controller 203 may comprise/implement a synchronizer 206 which is arranged to synchronize the first communicator 205 such that the communication operation (typically both receiving and transmitting data) is performed in (and typically only in) the communication time intervals of the power transfer phase, i.e. in the reduced power time intervals that are assigned for communication.

This may substantially improve communication performance.

The power transmitter 101 further comprises a foreign object detector 207 which is arranged to perform foreign object detection tests, i.e. to specifically detect whether any undesired conductive elements are likely to be present within the generated electromagnetic field.

In the system, the foreign object detection tests are based on measurements performed during foreign object detection time intervals, i.e. during reduced power time intervals that are assigned to foreign object detection.

In the example, the electromagnetic power transfer signal and the electromagnetic test signal used for the foreign object detection are generated by two different coils (driven by different drivers). Further, the signals will be referred to by different terms, namely the electromagnetic signal generated during power transfer time intervals will be referred to as the power transfer signal and the electromagnetic signal generated during foreign object detection time intervals will be referred to as the electromagnetic test signal, or just the test signal. However, it will be appreciated that in many embodiments, the electromagnetic signal may be generated from the same coil in both the power transfer time interval and the foreign object detection time interval, and indeed the same driver etc. may be used for both the power transfer time interval and the foreign object detection time interval. Indeed, the references to the test signals may in many embodiments be considered equivalent to the power transfer signal during the foreign object detection time interval.

During the foreign object detection time intervals, the power level of the power transfer signal is reduced, for example by the power receiver disconnecting its load and reducing the overall loading of the power transfer signal. In many embodiments, the power receiver 105 may be arranged to minimize the loading of the power transfer signal to only correspond to loading resulting from friendly metal (metal parts of the power receiver itself) and possible a small amount of power used by control functionality of the power receiver. The power receiver may often completely disconnect the target load from the power transfer signal during the reduced power time intervals. This may for example often reduce the loading of the power transfer signal from e.g. 5-50 W during the power transfer time intervals to less than 500 mW during the reduced power time intervals.

It should be noted that the power level of the power transfer signal may be reduced without this resulting in (or being caused by) a reduction in the generated electromagnetic field strength. For example, the power receiver disconnecting the load will result in a reduced amount of power being extracted from the electromagnetic field and the power transfer signal, and thus from the drive signal to the transmitter coil 103. However, this needs not result in reduction in the generated field strength and indeed may result in a large field strength as the opposing electromagnetic field caused by the current in the receiver coil 107 is reduced.

Thus, in many embodiments, the reduced power time intervals are characterized by a reduced power transfer from the power transmitter to the power receiver in comparison to that during the power transfer time intervals (or at least by a reduced maximum possible/available power transfer from the power transmitter to the power receiver in comparison to the maximum possible/available power transfer during the power transfer time intervals). However, the strength of the electromagnetic field generated by the transmitter coil 103 may remain the same or even increase.

Indeed, in many embodiments where the foreign object detection is based on measuring the loading of the electromagnetic field generated by the transmitter coil 103, it may be desirable to adapt the drive signal such that the generated electromagnetic field has a field strength suitable for performing the intended operation during the reduced power interval. This may possibly even be a higher field strength than during the power transfer time interval but the amount of power being transferred is reduced due to typically the power receiver disconnecting the load.

Although, in some embodiments, it may be possible to simply not change the parameters of the drive signal, the drive signal is typically adapted during the reduced power time interval where the power receiver load is reduced. The disconnection of the load will result in less damping of the transmitter coil 103, and accordingly unchanged drive parameters will result in an increased current in the transmitter coil 103/output resonance circuit. This will result in a higher induced voltage in the receive coil 107, and this may in some situations result in an overvoltage conditions. Such a scenario may e.g. be addressed by changing the parameters of the drive signal to reduce the amplitude of the drive signal during the reduced power time interval.

The reduced loading allows for a much more accurate foreign object detection in many situations. It will result in the power dissipated in a foreign object being a much larger proportion of the total power dissipation, and indeed typically in the foreign object dissipated power exceeded the power dissipated in the power receiver, thereby making the detection of this foreign object power dissipation much easier.

In many embodiments, the transmitter controller 203 is arranged to reduce the power level of the power transfer signal during the foreign object detection time intervals, and specifically it may switch the power transfer signal off completely (especially in the example of using different coils for generating the power transfer signal and the electromagnetic test signal for foreign object detection).

During an interval in which foreign object detection is performed, i.e. during a foreign object detection time interval, the foreign object detector 207 may evaluate conditions to determine whether a foreign object is considered present or not. During the foreign object detection time interval, the power transmitter 101 generates an electromagnetic test signal and the foreign object detection is based on evaluating characteristics and properties of this signal.

For example, the power level of (the power extracted from) the generated test signal may be used as an indication of the power being extracted by potential foreign objects (typically by comparing it to the expected power extraction from the power receiver 105). The power level of the electromagnetic test signal reflects the power that is extracted from the electromagnetic test signal by conductive elements (including the receiver coil 107) in the electromagnetic field. It thus indicates the power extracted by the combination of the power receiver 105 as well as any foreign objects that may be present. The difference between the power level of the electromagnetic signal and the power extracted by the power receiver 105 accordingly reflects the power extracted by any foreign objects present. The foreign object detection may for example be a low complexity detection wherein a detection of a foreign object is considered to have occurred if the difference between the power level of the electromagnetic signal (henceforth referred to as transmit power level) exceeds the reported power extracted by the power receiver 105 (henceforth referred to as received power level).

In the approach, the foreign object detection is accordingly based on a power level comparison between a transmitted power level and a reported received power level. The reaction to a detection of a foreign object may be different in different embodiments. However, in many embodiments, the power transmitter 101 may be arranged to terminate a power transfer (at least temporarily) in response to a detection of a foreign object.

In order to generate the test signal, the power transmitter 101 comprises a test coil 209 which is coupled to a test generator 211. The test generator 211 is arranged to generate a test drive signal for the test coil 209 to provide the electromagnetic test signal during the foreign object detection time interval. The test drive signal is an electrical signal fed to the test coil 209 resulting in the electromagnetic test signal being generated, i.e. the test coil 209 generates a corresponding electromagnetic field with a field strength depending on the test drive signal.

The test generator 211 may be comprise substantially the same functionality as the driver 201, e.g. the output of the test generator 211 may be a half or full bridge inverter. Indeed, as previously mentioned, in many embodiments, the test generator 211 may be implemented by the driver 201 and the test coil 209 may be implemented by the transmitter coil 103. Accordingly, in the following, all references to test generator 211 and the test coil 209 may as appropriate be considered as references to the driver 201 and the transmitter coil 103 for embodiments where the same coil is used for the generation of both the power transfer signal and the electromagnetic test signal. In such a situation, the power of the generated electromagnetic signal may be adapted to typically a fixed reference level during the foreign object detection time interval.

The power transmitter further comprises an adapter 213 which, as will be described in more detail later, is arranged to adapt a timing property of the reduced power time intervals in response to one or more messages received from the power receiver FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a second communicator 307.

The second communicator 307 is arranged to transmit data to the power transmitter by varying the loading of the receiver coil 107 in response to data to be transmitted to the power transmitter 101. The load variations are then detected and demodulated by the power transmitter 101 as will be known to the person skilled in the art.

In the example, the second communicator 307 is furthermore arranged to demodulate amplitude, frequency, and/or phase modulation of the power transfer signal in order to retrieve data transmitted from the power transmitter.

The power receiver controller 301 is further arranged to control the second communicator 307 such that the communication during the power transfer phase is performed in the communication intervals, i.e. during time intervals in which the power level of the power transfer signal is reduced.

Thus, similarly to the first communicator synchronizing communication with the power receiver to occur during reduced power time intervals, the second communicator also synchronizes communication with the power transmitter to occur during reduced power time intervals.

Figure 4:
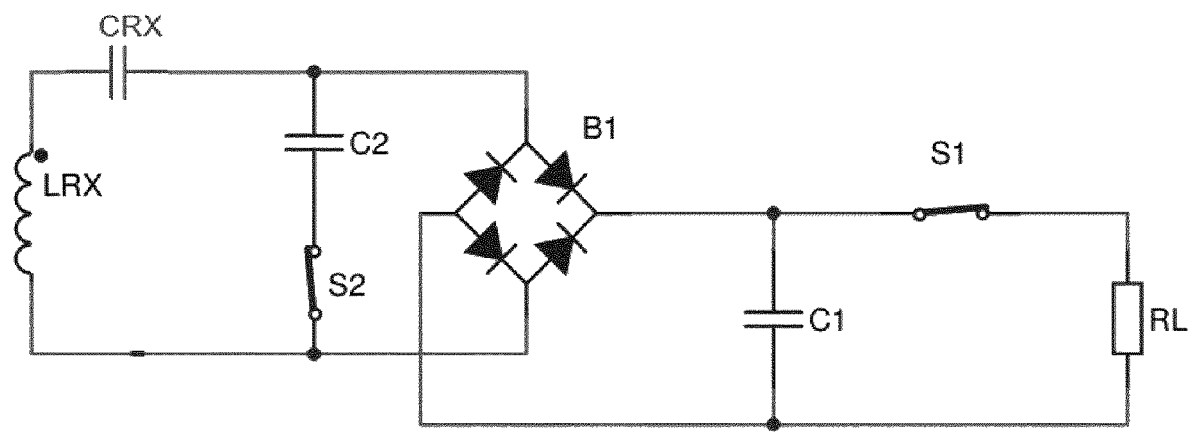
FIG. 4 illustrates an example of elements of a power receiver in accordance with some embodiments of the invention.

FIG. 4 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 303 which is indicated by reference sign RL via the switch 305 which is illustrated by switch S1. The switch 305 can accordingly be used to connect or disconnect the load from the power path and thus the load is a switchable load 305. It will be appreciated that whereas the switch S1 is shown as a conventional switch, it may of course be implemented by any suitable means including typically by a MOSFET. It will also be appreciated that the load 303 is illustrated as a simple passive port but that it may of course be any suitable load. For example, the load 303 may be a battery to be charged, a mobile phone, or another communication or computational device, may be a simple passive load etc. Indeed, the load 303 need not be an external or dedicated internal load but may for example include elements of the power receiver 105 itself. Thus, the load 303 illustrated in FIGS. 3 and 4 may be considered to represent any load of the receiver coil 107/the electromagnetic signal that can be disconnected by the switch 305/S1, and it is accordingly also referred to as a switchable load 305.

FIG. 4 further illustrates a load modulation capacitor C2 which can be connected or disconnected in parallel to the resonance circuit based on the switching of switch S2. The second communicator 307 may be arranged to control the switch S2 such that the load of the modulation capacitor C2 can be connected and disconnected in response to data to be transmitted to the power transmitter 101 thereby providing load modulation.

The power receiver 105 is arranged to enter a reduced power mode during the reduced power time interval(s) of each time frame during the power transfer phase. In the example, the power receiver 105 comprises a load controller 309 which controls the switch 305 (equivalently the switch 305 can be considered part of the load controller). During a reduced power time interval, the load controller 309 can disconnect the load 303 from the power receiver, i.e. it disconnects a load of the power receiver controller 301, and thus a load of the receiver coil 107. Thus, in this way the load controller 309 may reduce the loading of the receiver coil 107 during the reduced power time interval. Furthermore, not only is the load of the power receiver 105 reduced thereby making it easier to detect other power loss or to detect modulation but often more importantly the power receiver 105 enters a more well-defined or certain state in which the impact of load variations on the electromagnetic test signal is reduced.

It will be appreciated that the loading of the receiver coil 107 may not be completely switched off during the foreign object detection interval. For example, the power receiver 105 may still extract power for e.g. operating some internal circuitry. Thus, the load controller 309 may be arranged to disconnect a load from loading the receiver coil 107 while still allowing the receiver coil 107 to be loaded by one or more other loads. Indeed, the loading of the receiver coil 107 can be considered as being comprised of a load which is disconnected by the load controller 309 during the foreign object detection interval and a load which is not disconnected by the load controller 309. Thus, the load 303 can be considered to represent the load that is disconnected by the receiver coil 107 during the foreign object detection interval. This load may include both an external or internal load for which the power transfer is established but may also include for example internal control functionality temporarily switched off during the foreign object detection interval.

In some embodiments, the switchable load may e.g. be disconnected by a reduction of the induced voltage at the input of the rectifier B1 while at the same time maintaining a high voltage level at the output of the rectifier by means of stored energy at the switchable load (which could be a battery), and/or at the capacitor C1. This may stop the current through the rectifier B1 and therefore may effectively disconnect the switchable load.

The power receiver 105 includes a power controller 311 which is arranged to establish a power control loop with the power transmitter 101. Specifically, the power controller 311 can transmit power control messages to the power transmitter 101 and in response the power transmitter 101 may change the power level of the power transfer signal during the power transfer time intervals. Typically, the power controller 311 may generate power control error messages which indicate a request for the power transmitter 101 to increase or decrease the power level. The power controller 311 may determine the appropriate error messages by comparing a measured value to a reference value. During power transfer, the power controller 311 may compare the provided power level with the required power level and request an increased or decreased power level based on this comparison.

Figure 5:
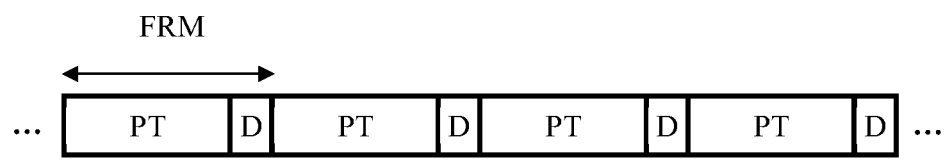
FIG. 5 illustrates an example of a time frame for a wireless power transfer system of FIG. 1.

As previously mentioned, the system applies a repeating time frame during the power transfer phase where the time frame comprises at least one power transfer time interval and on reduced power time interval. An example of such a repeating time frame is illustrated in FIG. 5 where power transfer time intervals are indicated by PT and reduced power time intervals are indicated by D. In the example, each time frame FRM comprises only one reduced power time interval and one power transfer time interval. However, it will be appreciated that in other embodiments, other time intervals may also be included in a time frame or a plurality of reduced power time intervals and/or power transfer time intervals may be included in each time frame. Specifically, a repeating time frame may comprise different types of reduced power time intervals, such as one or more foreign object detection time intervals and one or more communication time intervals.

In the approach, operations such as foreign object detection and/or communication may be performed in the reduced power time intervals, and thus the foreign object detection/communication and the power transfer may be separated in the time domain thereby resulting in reduced cross-interference from the power transfer to the foreign object detection/communication. Thus, the variability and uncertainty resulting from variations in the operating conditions for the power transfer can be isolated from the foreign object detection/communication resulting in a more reliable and accurate foreign object detection/communication.

In the power transfer phase, the power transmitter is thus arranged to perform power transfer during the power transfer time interval of the time frames of the power transfer phase. Specifically, during these time intervals, the power transmitter and the power receiver may operate a power control loop (the power control loop may be based on communication within communication time intervals corresponding to repeating time intervals). Thus, the level of the power being transferred may be dynamically varied.

In the reduced power time intervals of the time frames of the power transfer phase, the power level of the power transfer signal (specifically the level of power transferred to the power receiver) is reduced, and often minimized. This may be achieved by the power transmitter e.g. limiting the drive signal (e.g. switching it off completely) and/or by the power receiver, e.g. disconnecting the target load.

In many embodiments, especially where the same coil is used for both the power transfer signal and the electromagnetic test signal used for foreign object detection, the power transmitter may be arranged to reduce the level of the power transfer signal during the reduced power time interval relative to the level during the power transfer time interval. In many situations, the power level of the power transfer signal may be allowed to increase to high levels, such as e.g. to levels of 10-100 W, or even substantially higher in many applications (e.g. for power transfer to kitchen appliances). However, during a reduced power time interval, the power level of the generated electromagnetic signal may be reduced to a predetermined level that is much lower than the current or maximum allowable power during the power transfer time interval. For example, the power level may be set to a predetermined level not exceeding 1 W. In other words, the power of the electromagnetic test signal during the foreign object detection time interval may be constrained to a power level that is substantially (e.g. by a factor of no less than 2, 5, or 10) lower than a maximum allowed power level of the power transfer signal during the power transfer time interval.

As previously mentioned, the reduction in the power level need not correspond to a reduction of the field strength of the generated electromagnetic field. For example, the power transfer level may be significantly reduced by the loading of the field by the power receiver being reduced, e.g. by disconnecting the load 303. With reference to FIG. 4, this may for example be achieved by a small reduction of the field strength resulting in the induced voltage (in LRX) remaining below the voltage of the capacitor (C1) resulting in the rectifier bridge (B1) effectively isolating the capacitor (C1) from the receiver coil (LRX), resulting in an effective intrinsic disconnection of the load (RL).

It may be desirable to keep the magnetic field strength relatively high in order to measure sufficient power dissipation in a foreign object, and thus in order to facilitate and improve foreign object detection.

Alternatively or additionally, the power receiver 105 may be arranged to reduce the load of the generated electromagnetic signal/field during the reduced power time interval relative to the level during the power transfer time interval, i.e. the power receiver 105 is arranged to decrease the loading of the power receiver 105 of the electromagnetic test signal during the reduced power time interval relative to the loading of the power transfer signal during the power transfer time interval. Specifically, in the example of FIG. 3 the load controller 309 and the switch 305 may be arranged to disconnect the switchable load 303 during the foreign object detection time interval and to connect it during the power transfer time interval. Thus, during the reduced power time interval, the power receiver 105 may switch off (typically) the main/target load and indeed in many embodiments only a minimal load required for the continued operation of the power receiver 105 may be maintained.

In the example of FIG. 4, the switch S1 may be used to disconnect the load during the foreign object detection time interval. It will be appreciated that in embodiments where the switchable load 303 requires a more constant power provision, the switch S1 may be positioned before the capacitor C1 or another energy reservoir may be provided after switch S1 to supply the switchable load 303 with power during the foreign object detection time interval (or e.g. the previously described approach of reducing the induced voltage at the input of the rectifier B1 while at the same time maintaining a high voltage level at the output of the rectifier B1 by means of stored energy at the switchable load (e.g. a battery), and/or at the capacitor C1 may be used).

The power receiver 105 may accordingly reduce a load of the power receiver during a reduced power time interval. Specifically, the load of the electromagnetic test signal by the power receiver during the foreign object detection time interval will be less than the load of the power transfer signal by the power receiver during the power transfer time interval (the load may e.g. be considered the effective resistive impedance of respectively the transmitter coil 103 and the test coil 209 during the power transfer time interval and the foreign object detection time interval respectively). Typically, the power transfer signal and the electromagnetic test signal will have corresponding properties and thus both induce a signal in the receive coil 107. Therefore, disconnecting the switchable load 303 during the foreign object detection time interval will reduce the load of the electromagnetic test signal relative to the load that is experienced by the power transfer signal (and thus would be experienced by an electromagnetic test signal) generated during the power transfer time interval when the load is connected.

The disconnection of the switchable load 303 not only reduces the load of the electromagnetic test signal but may also provide for this load to be more predictable and to have reduced variation. Typically, the load of a power transmitter by a power receiver may vary substantially not only from application to application, but also as a function of time for the same application and power transfer session. The power control loop is operated during the power transfer phase to adapt to such variations. However, by introducing a reduced power time interval in which the load may be disconnected (or otherwise set to e.g. a predetermined level), it is possible to enter the power receiver into a reference mode in which the loading of the electromagnetic field is more predictable. Thus, e.g. the foreign object detection tests can be performed based on the assumption that the power receiver is in this reference or test mode, and thus e.g. a predetermined loading of the electromagnetic test signal can be assumed. The approach may thus not only allow for the loading by the power receiver 105 to be reduced (thereby improving accuracy by the relative impact of any foreign objects being higher) but also allows this to be more predictable thereby facilitating the compensation for the presence of the power receiver during the foreign object detection test.

Thus, the system of FIGS. 1-4 provides for a much improved foreign object detection test approach where the foreign object detection tests are performed under much more controlled conditions thereby allowing a more accurate and reliable foreign object detection tests to be performed. Similarly, it provides an environment allowing for improved communication with less interference caused from the power transfer operation.

In many embodiments, the reduced power time interval may comprise both a communication time interval and a foreign object detection time interval.

In the system of FIG. 1, the power transmitter and the power receiver are arranged to vary timing properties of the reduced power time interval of the repeating time frame based on communication between the two entities.

Specifically, the power transmitter comprises an adapter 213 for adapting a timing property of the reduced power time interval in response to at least a first message received from the power receiver.

In many embodiments, the power receiver may transmit one or more messages to the power transmitter requesting a specific timing property of the reduced power time intervals. The power transmitter and power receiver may then proceed to apply these timing settings for the consequent operation.

In many embodiments, the power transmitter and power receiver may in particular be arranged to communicate in order to establish a duration of the reduced power time intervals and/or the duration between reduced power time intervals, and typically the duration between consecutive reduced power time intervals.

The approach may provide improved trade-offs and may in particular allow the operation to be adapted to the specific properties of the individual devices, and in many embodiments to the specific characteristics of the individual power transfer operation. For example, the timing may be adapted to reflect the power level of the power transfer.

The approach may address that the duration of the reduced power time interval may affect the behavior of not only the power transmitter and the power receiver but also potentially of the end load, such as e.g. a device that is powered from the power receiver.

Often, if the reduced power time interval is too long, the device may suffer from a decreased effective supply voltage. This is especially relevant when the energy storage of the device is limited, such as for example where a capacitor at the input of the device (output of the power receiver) is smaller than desired. The device must be able to bridge the time during which the power transfer is interrupted, and this typically requires a capacitor that is relatively large (it will be noted that in many embodiments, the power receiver may itself comprise such a capacitor as well as potentially voltage regulation to provide a constant output voltage. However, this just means that the described issue will be relevant for the power receiver rather than the external load device).

If the time slot is too short, the power transmitter may not be able to perform the specific operation acceptably. For example, the power transmitter may not be able to perform a FOD-measurement with sufficient accuracy, e.g. because the measurement signal has not been stabilized when the measurements are executed, or because an insufficient number samples can be taken. As another example, a reduced power time interval which is too short may not provide a sufficient communication bandwidth, e.g. it may not be possible to communicate enough data to support power control reporting and the provision of other measurement results.

The optimal duration of the reduced power time interval may accordingly depend on a number of characteristics and properties, such as the specific operating parameters and implementation of the power receiver. In some embodiments, the power receiver may accordingly transmit a message to the power transmitter and the power transmitter may be arranged to adapt the timing of the reduced power time interval in response to this message.

The message may specifically explicitly be a request for a given duration of the reduced power time interval. In many embodiments, the power receiver may evaluate the operating conditions, such as the power being drawn by the external load and may calculate a maximum time during which the energy reservoir/capacitor is able to maintain sufficient charge to prevent the supply voltage to the load to drop too much. For example, the maximum duration may be twice as high for a load of 1 A compared to a load of 2 A. The power receiver may thus transmit a request for a duration which is twice as high for 2 A than it is for 1 A load.

As another example, suitable values for the duration of the reduced power time interval may be predetermined for the power receiver, for example during the manufacturing phase. For example, the power receiver may be a battery charger with a maximum charge current. The corresponding time duration for which the built in capacitor can retain sufficient charge to provide the maximum charge current can be determined during the design phase and stored permanently in the power receiver during the manufacturing phase. When initiating power transfer with a power transmitter, the power receiver can retrieve this value and transmit a request for the reduced power time interval duration to the power transmitter. The power transfer phase can then proceed using a repeating time frame with reduced power time intervals in accordance with the stored value. As power receivers may vary very substantially in the requirements and functions, this may allow the power transmitter and the power transfer operation to adapt to the individual characteristics of the power receiver.

In some embodiments, the system may be arranged to set a duration between reduced power time intervals based on a message transmitted from the power receiver to the power transmitter. The system may specifically set the duration between reduced power time intervals of consecutive repeating time frames and may effectively adapt the duration of the reduced power time interval in response to messaging from the power receiver to the power transmitter.

In order to provide sufficient average power transfer, the peak power level of the power transfer during the power transfer time intervals increases the shorter the duration of these are. In many embodiments, the power transfer level may be limited (by the power transmitter or possibly by the power receiver which may only be designed to extract a given maximum amount of power). In such cases, the power receiver may transmit a request for a duration between reduced power time intervals which is sufficient to ensure that the capacitor will be fully charged before the onset of the next repeating time interval (this is particularly appropriate for embodiments in which the power transmitter switches off the power transfer signal during the reduced power time intervals).

In some embodiments, a single request may be transmitted relating to both the duration of the reduced power time interval and the duration between these. For example, in some embodiments, the repeating time frame may have a constant duration and the power receiver may request a specific duty cycle to be applied.

In many embodiments, the power transmitter is arranged to impose a minimum duration requirement on the duration of the reduced power time interval. This minimum duration may be used to ensure that the operation that is to be performed in the reduced power time interval actually has sufficient time to achieve the desired result. For example, it may ensure that the foreign object detection can be performed with sufficient reliability (including sufficient time for setting up and stabilizing the measurement signal). As another example, the power transmitter may be arranged to require a minimum duration in order for the communication to have sufficient bandwidth.

In many embodiments, the power transmitter is arranged to impose a maximum duration requirement on the duration between reduced power time intervals. This maximum duration may be used to ensure that the operation that is to be performed in the reduced power time interval is performed sufficiently frequently. For example, it may ensure that the foreign object detection is performed with sufficiently high frequency to ensure that the emergence of a foreign object will be detected before this can be heated to unacceptable levels. As another example, it may ensure that communication is performed sufficiently frequently (e.g. enabling a sufficient update rate for the power control loop).

As yet another example, in some embodiments, the measurements for foreign object detection may be spread over multiple reduced power intervals to improve the accuracy and/or to add some redundancy. This enables more precision for foreign object detection. If the duration of a reduced power time is short, and thus only allows for a small number of samples/measurements, the duration between reduced power time intervals may be short in order to compensate and enable a sufficient amount of samples/measurements to be acquired within a given required time that ensures that a foreign object is detected before it heats up too much.

Similarly, the power receiver may be arranged to impose restrictions on the timing values. For example, the power receiver may determine a desired value for the duration of the reduced power time interval subject to a maximum value that ensures that sufficient power can be provided to an external load without the discharging of the energy reservoir (typically a capacitor) resulting in unacceptable voltage drops.

Similarly, the power receiver may, as mentioned above, determine a desired value for the duration between reduced power time intervals subject to a minimum value that ensures that the power receiver capacitor can be fully recharged.

In many embodiments, the timing properties of the repeating time interval will be subject to requirements imposed by both the power receiver and the power transmitter. Typically, both the power transmitter and the power receiver will have requirements that must simultaneously be met in order for the timing value to be adopted. For example, the setting of the duration of the repeating time interval and/or the duration between consecutive repeating time intervals is subject to the values meeting requirements of both the power transmitter and the power receiver.

Further, in many embodiments, this may typically be one of the devices (i.e. the power receiver or the power transmitter) imposing a restriction on the maximum value, and the other device imposing a restriction on the minimum value of the timing property being set.

Specifically, as explained previously, in many embodiments, the duration of the reduced power time interval may be subject to a minimum duration imposed by the power transmitter and a maximum duration imposed by the power receiver.

Similarly, in many embodiments, the duration between reduced power time intervals may be subject to a maximum duration imposed by the power transmitter and a minimum duration imposed by the power receiver.

Such implementations may impose efficient control of the suitable timings for the reduced power time intervals in many embodiments and may allow for reduced complexity and easier interworking with both devices independently ensuring that the reduced power time intervals will have timing properties that allow acceptable performance for both devices, and thus for the overall power transfer.

The exact approach and message exchange used to set the timing properties of the reduced power time intervals depends on the preferences and requirements of the individual embodiment, and different approaches may be used in different systems.

However, in many systems, such as typically for Qi type implementations, the approach is based on the power receiver transmitting requests for suitable timing values and the power transmitter accepting or rejecting the rejected values.

Accordingly, the power receiver of FIG. 3 comprises a request controller 311 which is arranged to transmit a request message to the power transmitter where the request message comprises a request for a requested value of the timing property.

For example, the power receiver may determine a suitable value for the duration of the reduced power time interval.

For example, it may estimate the external load and from this calculate the total power consumption (of both the target load and the power receiver itself). It may then calculate the time it takes for the energy storage to experience a voltage drop of a given acceptable value for that total power consumption. The resulting time corresponds to the maximum possible duration of the reduced power time interval. Typically, the power receiver may then initially request a duration which is substantially lower in order to provide sufficient margin and a safer operating point. For example, it may transmit a message to the power transmitter requesting a duration of the reduced power time interval of half the determined maximum value.

Upon receiving the message, the power transmitter may evaluate whether the requested duration is acceptable. For example, it may compare the requested duration to a pre-stored minimum time required for performing a sufficiently accurate foreign object detection. If the requested duration exceeds this minimum time, the power transmitter proceeds to accept the requested duration and otherwise it rejects it.

The power transmitter may then transmit a response message back to the power receiver which comprises an indication of whether the requested value has been accepted by the power transmitter. This response message is received by a response controller which proceeds to determine the timing property for the reduced power time interval in response to this.

For example, the response message may comprise a single bit indicating whether the requested duration is accepted or rejected. If the requested duration is accepted, both devices subsequently executes the power transfer phase using the agreed duration of the reduced power time interval (after completing the initialization process in case there are further operations or negotiations to perform before starting the power transfer). If the requested duration is rejected, the response controller 313 may control the request controller 311 to transmit a new request. For example, it may request a duration of 75% of the maximum acceptable value. The process may then iterate until a suitable timing property value has been agreed.

If no common accepted value can be agreed upon, specifically if the power transmitter rejects a request for the duration of the reduced power time interval corresponding to the maximum allowable duration calculated by the power receiver, the power receiver and power transmitter may terminate the power transfer process, or e.g. the power receiver may change its operation to allow the reduced power time interval to be increased (e.g. the maximum power that can be provided to an external load may be reduced).

It will be appreciated that a similar approach can be used to set the duration between reduced power time intervals.

In many embodiments, the power transmitter may transmit a message indicating preferred or allowable values for the timing property to the power receiver. For example, the power transmitter may transmit one or more messages to the power receiver indicating the minimum acceptable duration of the reduced power time interval and/or the maximum acceptable duration between the reduced power time intervals (or of course, in some embodiments, only one of the timing parameters may be transmitted). The power receiver may then take these values into account when determining suitable requested values. Such an approach may facilitate the operation in many embodiments and may often reduce the number of requests that the power receiver needs to transmit. Specifically, rather than guess at a value that is acceptable to the power transmitter, the power receiver can directly determine a requested value that is indicated to be acceptable by the power transmitter. Typically, e.g. unless conditions have changed at the power transmitter, the first requested value will then be accepted by the power transmitter.

In many such embodiments, the power transmitter may be arranged to transmit the message indicating recommended/allowable/accepted values to the power receiver in response to a request for such information from the power receiver. Thus, the power receiver may remain as the instigator and retain the initiative and control for the message exchange and operation.

Specifically, in many embodiments, the request controller 311 may control the second communicator to transmit a request to the power transmitter for this to provide a timing property constraint. This timing property constraint is indicative of a constraint on the values of a given timing property, such as the duration of the reduced power time interval, or the durations between consecutive reduced power time intervals. The timing property constraint may for example indicate a maximum value, a minimum value, an allowable range, a recommended and/or preferred range etc.

The power receiver may then proceed to determine the requested value for the timing property to comply with this constraint if possible. For example, it may change the operation or interface with the external load if necessary to meet the imposed constraint.

In many embodiments, the determination of a suitable timing property may be performed during an initialization phase prior to the power transfer phase. Thus, prior to starting a new power transfer operation, the power transfer system may enter an initialization phase during which suitable timing properties are determined for the reduced power time interval as described above. The power transmitter and power receiver may then proceed to apply the determined properties during the power transfer phase. In particular, the determination of suitable timing properties of the repeating time frame may be determined during the negotiation phase being performed during the initialization of a new power transfer operation.

This may allow for suitable parameters to be determined while providing a low complexity and reliable operation. The timing property values determined during the initialization phase may specifically be used throughout the power transfer phase with no changes or modifications.

However, in some embodiments, the timing property (or properties) may dynamically be varied throughout the power transfer phase. In some embodiments, the power receiver may be arranged to dynamically and repeatedly send messages to the power transmitter requesting a value of a given timing property, e.g. the duration of the reduced power time interval. The adapter 213 may in such embodiments be arranged to dynamically adapt the timing property during the power transfer phase in response to these messages.

For example, during a power transfer phase, the power receiver may continuously measure the power provided to the target load. If this falls below the expected load agreed during the initialization phase, the power receiver may proceed to request a new duration of the reduced power time interval which is longer than the current value to reflect that the energy storage capacitor is drained at a slower rate. Conversely, if it detects an increasing power provision to the target load, the power receiver may proceed to request a shorter duration of the reduced power time interval than the current duration. The power receiver may continuously measure these values and continuously transmit request messages to the power transmitter.

In response to receiving these messages, the power transmitter may accept or reject the requested values. If accepted, a confirmation message is transmitted to the power receiver, and the new value is adopted. If rejected, a rejection message is transmitted to the power receiver and the previous value is maintained unchanged.

The power receiver and power transmitter may effectively in some embodiments establish a control loop adapting the timing properties of the reduced power time interval.

It will be appreciated that the dynamic variation of the timing property during the power transfer phase may be in addition to setting initial values during the initialization phase. In other embodiments, the power transfer phase may instead start with the same predetermined timing property values which are determined based on worst case considerations and without any initialization phase. The dynamic control loop operation will then adapt these to more suitable values.

In the following a very specific example of an approach and considerations for a Qi type power transfer system will be described. In the system, the reduced power time interval will include reduced power time intervals corresponding to both foreign object detection time intervals and to communication time intervals.

In the specific description, the following acronyms and abbreviations will be applied:
PTx power transmitter.
PRx power receiver.
Device device containing a PRx, a (partly) disconnectable load, friendly metal.
Friendly metal metal of device, when exposed to the magnetic field of the PTx dissipates power.
FO Foreign Object.
FOD Foreign Object Detection.
Com Communication.
PTx coil single coil, or set of coils at the PTx to which the PTx provides an AC Voltage and Current to generate a magnetic field (the power transfer signal) for the power receiver.
TS Time slot, corresponding to time interval.
FOD TS Foreign Object Detection Time Slot, reduced power time interval used for foreign object detection.
Com TS Communication Time Slot, reduced power time interval used for communication.

Figure 6:
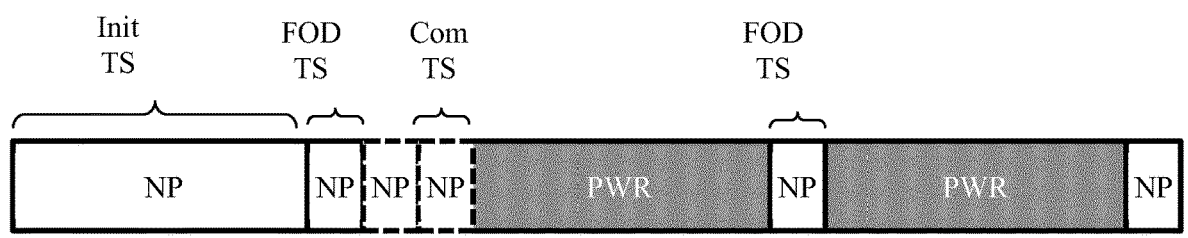
FIG. 6 illustrates an example of a time frame for a wireless power transfer system in accordance with some embodiments of the invention.

In the specific example, a time division approach and repeating time frame as illustrated in FIG. 6 is used. In the figure, NP indicates "No Power" corresponding to a reduced power time interval, typically resulting from the power receiver disconnecting the target load. PWR indicates a power transfer time interval.

FOD Time Slot

The PRx has its load disconnected. This means that no (or very little) power is delivered to its load. The PTx applies e.g. stored setting of the measurement signal and measures the combined influence of the friendly metal and FO. It compares this influence with the stored expected influence of the friendly metal to determine the influence of any FO. It may then use the determined impact of the FO to determine the maximum amplitude of the drive signal in relation to the frequency at which it regards the situation to be safe, meaning at which it expects the temperature rise of a FO to be within safe limits (or in some embodiments, it may simply terminate the power transfer if the influence is determined to be too high). The PTx will then limit its drive signal to this maximum and report a warning if the PRx tries to control the drive signal above this maximum.

If the PTx detects a change in the combined influence of the friendly metal and FO, it may return to the initialization time-slot to re-establish the conditions for the FOD measurement. To prevent early triggers for returning to the initialization time-slot, the PTx can combine the results of multiple FOD time slots (e.g. apply an averaging window) and/or adjust the drive signal within certain margins.

COM Time Slot

The PRx has its load disconnected. This means that no (or very little) power is delivered to its load. The PRX is now able to communicate, e.g. for the purpose of:
Power Control information
Identification
Measurement results of the PRX e.g. power reception, battery condition, housing temperature
Measurement results of the PTX e.g. coil current, power delivery, components temperature Initialization Time Slot Typically prior to the power transfer phase but could be performed during the power transfer phase, e.g. as part of every repeating time frame.

The PRx has its load disconnected. This means that no (or a very little) power is delivered to its load.

The PTx controls its drive signal to the PTx-coil to establish a situation at which following conditions apply:
The influence of the friendly metal of the device on the magnetic field is known by the PRx or can be accurately determined by the PRx. E.g. the power dissipation in the friendly metal for a given amplitude and frequency of the magnetic field is known by the PRx
The PTx can accurately measure the combined influence of the friendly metal and a FO. E.g. the transmitted power can be accurately determined by the PTx.

As a result, the system can accurately determine the influence of the FO on the magnetic field. This influence preferably is related to the expected increase of temperature caused by the power dissipation in the FO caused by its exposure to the magnetic field of the PTx coil when the PTx is providing power to the PRx.

To establish the above situation, the PRx can provide information on an appropriate magnetic field, e.g. by communicating its type, the allowed frequency range and optionally the required amplitude of the drive signal for the PTx-coil. The latter of course depends on the design of the PTx-coil. In addition, the PRx could have a measurement coil of which the induced Voltage gives a good indication of the field to which the friendly metal of the device is exposed. In that case the PRx could provide control information to the PTx to control the field to a level at which the influence of the friendly metal can be accurately determined by the PRx.

Once the above situation has been established, the PTx stores the setting of the drive signal, and the expected influence of the friendly metal as determined by the PRx.

Measurements and communication can be separated in time to avoid the interference between them.

In the example, prior to the power transfer, a negotiation/initialization phase is performed in which the PTx and PRx negotiate the time constraints of the different time slots. These timing contains two parameters: the duration of each slot (SLOT duration) and the interval time between the different slots (SLOT interval).

In the following some examples of the considerations of the power receiver and the power transmitter with respect to the individual time slots will be provided:

PTx Considerations with Respect to FOD:
The PTx supports a minimum FOD_duration (FOD_duration_min) at which it can perform at least one FOD-measurement for its FOD function; it does not support any shorter FOD_duration.
To achieve sufficient confidence on FOD, the PTx relies on a minimum number of FOD-measurements (FOD_count_min). To react on the presence of a FO before it heats up too much, the PTx shall be able to perform at the necessary FOD-measurements within a maximum time (FOD_detection_max).
Once the PTx has negotiated the FOD_duration, it can calculate how many FOD-measurements it can perform in a FOD-slot (FOD_meas_nr) and can derive the maximum FOD-interval time (FOD_interval_max).

$$FOD\_interval\_max = FOD\_detection\_max * FOD\_meas\_nr / FOD\_count\_min$$

PTx Considerations with Respect to COM:
The PTx supports a minimum COM_duration (COM_duration_min) at which it can send/receive at least one message; it does not support any shorter Com_duration.
To enable the minimal number of messages the PTx relies on a minimum number of communication messages (COM_count_min).
Once the PTx has negotiated the COM_duration, it can calculate how many communication messages it can process in a COM-slot (COM_mes_nr) or vice versa;
Once the PTx has negotiated the number of communication messages (COM_mes_nr), it can calculate the maximum duration of the communication slot (COM_duration_max).

PRx Considerations
The PRx allows for a maximum FOD-slot duration (FOD_duration_max) or a maximum COM-slot duration (COM_duration_max), to prevent that the energy storage on which it relies on during one of these time slots is not discharged too much.
The PRx requires for a minimum duration of the time slot interval (FOD_interval_min or COM_interval_min) to ensure that the energy storage is sufficiently charged at the beginning of any of the time slots.

In the following some specific examples of the message interaction between the power receiver and the power transmitter to establish timing parameters is described:

FOD-Slot Duration
(PTx informs PRx on FOD_duration_min (on request of PRx)
PRx requests a FOD_duration
(For optimal FOD, PRx preferably requests FOD_duration close to FOD_duration_max)
PTx responds whether it accepts/rejects the proposed FOD_duration FOD-Slot Interval
PTx calculates FOD_interval_max
(PTx informs PRx on FOD_interval_max (on request of PRx)
PRx requests a FOD_interval
(For optimal FOD, PRx preferably requests FOD_interval close to FOD_interval_min)
PTx responds whether it accepts/rejects the proposed FOD_interval COM-Slot Duration
(PTx informs PRx on COM_duration_min (on request of PRx)
PRx requests:
a minimum COM_duration
or the minimum number of communication messages (COM_count_min).
PTx responds whether it accepts/rejects the proposed COM_duration COM-Slot Interval
PTx calculates COM_interval_max
PTx informs PRx on COM_interval_max (on request of PRx)
PRx requests a COM_interval
For optimal communication, PRx preferably requests COM_interval time close to FOD_interval_time
PTx responds whether it accepts/rejects the proposed COM_interval It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
a transmitter coil,
   wherein the transmitter coil is arranged to generate a power transfer signal,
   wherein the power transfer signal uses a repeating time frame during a power transfer phase,
   wherein the repeating time frame comprises at least one power transfer time interval and a reduced power time interval,
   wherein a first power transfer level of the power transfer signal is reduced during the reduced power time interval to a second power transfer level,
   wherein the second power transfer level is greater than zero and less than the first power transfer level;
a driver, wherein the driver is arranged to generate a drive signal for the transmitter coil;
a communicator circuit, wherein the communicator circuit is arranged to receive messages from a power receiver;
an adapter circuit, wherein the adapter circuit is arranged to adapt a timing property of the reduced power time interval in response to at least one first message received from the power receiver;
a test coil, wherein the test coil is arranged to generate an electromagnetic test signal;
a test generator, wherein the test generator is arranged to generate a test drive signal for the test coil;
a synchronizer circuit configured to synchronize the test generator such that the electromagnetic test signal is provided during the reduced power time interval of each repeating time frame; and
a foreign object detector, wherein the foreign object detector is configured to perform, during the reduced power time interval of the repeating time frame, a foreign object detection test using a measured parameter of the test drive signal.

2. The power transmitter of claim 1, wherein the timing property is a duration of the reduced power time interval.

3. The power transmitter of claim 1, wherein the timing property is a duration between reduced power time intervals of consecutive repeating time frames.

4. The power transmitter of claim 1,
wherein the communicator circuit is arranged to transmit messages to the power receiver,
wherein the power transmitter is arranged to transmit a second message to the power receiver prior to receiving the at least one first message,
wherein the second message indicates at least one of a duration of the reduced power time interval and a duration between reduced power time intervals of consecutive repeating time frames.

5. The power transmitter of claim 1,
wherein the at least one first message is a request message,
wherein the request message indicates of a requested value for the timing property,
wherein the power transmitter is arranged to accept or reject the requested value.

6. The power transmitter of claim 1,
wherein the adapter circuit is arranged to determine the timing property during an initialization phase,
wherein the initialization phase occurs prior to the power transfer phase.

7. The power transmitter of claim 1, wherein the adapter circuit is arranged to dynamically adapt the timing property during the power transfer phase in response to a plurality of messages received from the power receiver during the power transfer phase.

8. The power transmitter of claim 1, wherein the first communicator circuit is arranged to synchronize communication with the power receiver such that the communication occurs during the reduced power time intervals.

9. The power transmitter of claim 1, wherein the power transfer signal comprises an electromagnetic field, and wherein a strength of the electromagnetic field during the reduced power time interval is greater than or equal to a strength of the electromagnetic field during the power transfer time interval.

10. A wireless power transfer system comprising:
a power transmitter; and
a power receiver;
the power transmitter comprising:
   a transmitter coil,
      wherein the transmitter coil is arranged to generate a power transfer signal,
      wherein the power transfer signal uses a repeating time frame during a power transfer phase,
      wherein the repeating time frame comprises at least one power transfer time interval and a reduced power time interval,
      wherein a first power transfer level of the power transfer signal is reduced during the reduced power time interval to a second power transfer level,
      wherein the second power transfer level is greater than zero and less than the first power transfer level;
   a driver, wherein the driver is arranged to generate a drive signal for the transmitter coil;
   a first communicator circuit, wherein the first communicator circuit is arranged to receive messages from a power receiver;
   an adapter circuit, wherein the adapter circuit is arranged to adapt a timing property of the reduced power time interval in response to at least one first message received from the power receiver;
   a test coil, wherein the test coil is arranged to generate an electromagnetic test signal;
   a test generator, wherein the test generator is arranged to generate a test drive signal for the test coil;
   a synchronizer circuit configured to synchronize the test generator such that the electromagnetic test signal is provided during the reduced power time interval of each repeating time frame; and
   a foreign object detector, wherein the foreign object detector is arranged to initiate and perform, during the reduced power time interval of the repeating time frame, a foreign object detection test in using a measured parameter of the test drive signal; and
the power receiver comprising:
   a second communicator circuit, wherein the second communicator circuit is arranged to communicate with the power transmitter;

a request controller,
    wherein the second communicator circuit is arranged to communicate the at least one first message to the power transmitter,
    wherein the first message comprises a request for a requested value of the timing property;
a response controller,
    wherein the response controller is arranged to receive a request response from the power transmitter,
    wherein response controller is arranged to determine the timing property in response to the request response,
    wherein the request response is indicative of whether the requested value has been accepted by the power transmitter; and
a load controller, wherein the load controller is arranged to adapt a loading of the power transfer signal such that the loading is reduced during the reduced power time intervals.

11. The wireless power transfer system of claim 10,
wherein the request controller is arranged to request a timing property constraint from the power transmitter,
wherein the response controller is arranged to receive a timing property constraint indicator from the power transmitter,
wherein the request controller is arranged to determine the requested value of the timing property in response to the timing property constraint.

12. The wireless power transfer system of claim 10,
wherein the timing property is a duration of the reduced power time interval,
wherein the request controller is arranged to determine the requested value of the timing property subject to a maximum duration,
wherein the adapter circuit is arranged to determine a value for the timing property in response to a minimum duration.

13. The wireless power transfer system of claim 10,
wherein the timing property is a duration between the reduced power transfer time of sequential repeating time frames,
wherein the request controller is arranged to determine the requested value of the timing property subject to a minimum duration,
wherein the adapter circuit is arranged to determine a value for the timing property in response to a maximum duration.

14. The system of claim 10, wherein the measured parameter comprises a transmitted power of the power transmitter and a reported received power by the power receiver.

15. A method of operation for a power transmitter comprising:
generating a power transfer signal,
    wherein the power transfer signal uses a repeating time frame during a power transfer phase,
    wherein the repeating time frame comprises at least one power transfer time interval and a reduced power time interval,
    wherein a first power transfer level of the power transfer signal is reduced to a second power transfer level during the reduced time interval,
    wherein the second power transfer level is greater than zero and less than the first power transfer level;
generating a drive signal for a transmitter coil;
receiving messages from a power receiver;
adapting a timing property of the reduced power time interval in response to at least one first message received from the power receiver;
generating a test drive signal for a test coil utilizing a test generator, wherein the test generator is arranged to generate an electromagnetic test signal;
synchronizing the test generator such that the electromagnetic test signal is provided during the reduced power time interval of each repeating time frame; and
performing, during the reduced power time interval of the repeating time frame, a foreign object detection test using a measured parameter for the test drive signal.

16. The method of claim 15, wherein the timing property is a duration of the reduced power time interval.

17. The method of claim 15, wherein the timing property is a duration between reduced power time intervals of consecutive repeating time frames.

18. The method of claim 15, further comprising:
transmitting a second message to the power receiver prior to receiving the at least one first message,
wherein the second message indicates at least one of a duration of the reduced power time interval and a duration between reduced power time intervals of consecutive repeating time frames.

19. The method of claim 15, further comprising, accepting or rejection a requested value,
wherein the at least one first message is a request message,
wherein the request message indicates of the requested value for the timing property.

20. The method of claim 15, further comprising, determining the timing property during an initialization phase, wherein the initialization phase occurs prior to the power transfer phase.

21. The method of claim 15, further comprising, dynamically adapting the timing property during the power transfer phase in response to a plurality of messages received from the power receiver during the power transfer phase.

22. The method of claim 15, wherein the power transfer signal comprises an electromagnetic field, and wherein a strength of the electromagnetic field during the reduced power time interval is greater than or equal to a strength of the electromagnetic field during the power transfer time interval.

23. A method of operation for a wireless power transfer system wherein the power transfer system comprises a power transmitter and a power receiver, the method comprising:
generating a power transfer signal using the power transmitter,
    wherein the power transfer signal uses a repeating time frame during a power transfer phase,
    wherein the repeating time frame comprises at least one power transfer time interval and a reduced power time interval,
    wherein a first power transfer level of the power transfer signal is reduced to a second power transfer level during the reduced power time interval,
    wherein the second power transfer level is greater than zero and less than the first power transfer level;
generating a drive signal for using transmitter coil of the power transmitter to generate the power transfer signal;
receiving messages from the power receiver by the power transmitter;

adapting, using the power transmitter, a timing property of the reduced power time interval in response to at least one first message received from the power receiver;

generating, using the power transmitter, a test drive signal for a test coil to generate an electromagnetic test signal;

synchronizing the test generator such that the electromagnetic test signal is provided during the reduced power time interval of each repeating time frame;

performing, using the power transmitter during the reduced power time interval of the repeating time frame, a foreign object detection test using a measured parameter for the test drive signal;

communicating with the power transmitter using the power receiver;

transmitting, by the power receiver, the at least one first message to the power transmitter, wherein the at least one first message comprises a request for a requested value of the timing property;

receiving, by the power receiver, a request response from the power transmitter;

determining, by the power receiver, the timing property in response to the request response, wherein the request response is indicative of whether the requested value has been accepted by the power transmitter; and adapting, by the power receiver, a loading of the power transfer signal such that the loading is reduced during the reduced power time intervals.

24. The method of claim 23, wherein the measured parameter comprises a transmitted power of the power transmitter and a reported received power by the power receiver.

25. A non-transitory medium having stored thereon instructions that when executed cause processing circuitry of a wireless power transfer system to:

generate a power transfer signal,
wherein the power transfer signal uses a repeating time frame during a power transfer phase,
wherein the repeating time frame comprises at least one power transfer time interval and a reduced power time interval,
wherein a first power transfer level of the power transfer signal is reduced to a second power transfer level during the reduced power time interval;
wherein the second power transfer level is greater than zero and less than the first power transfer level;

generate a drive signal for the transmitter coil;

receive messages from a power receiver;

adapt a timing property of the reduced power time interval in response to at least one first message received from the power receiver;

generate a test drive signal for a test coil utilizing a test generator, wherein the test coil is arranged to generate an electromagnetic test signal;

synchronize the test generator such that the electromagnetic test signal is provided during the reduced power time interval of each repeating time frame; and perform a foreign object detection test, during the reduced power time interval of the repeating time frame, using a measured parameter for the test drive signal.

* * * * *